W. F. BREIDENBACH.
SAFETY DEVICE FOR HIGH PRESSURE GAS TANKS.
APPLICATION FILED AUG. 9, 1918.
1,303,248.
Patented May 13, 1919.
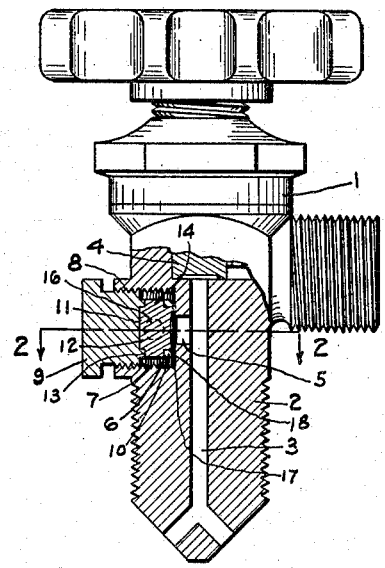
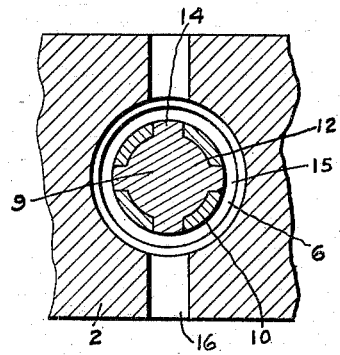
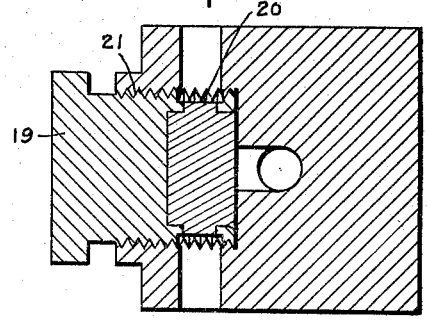
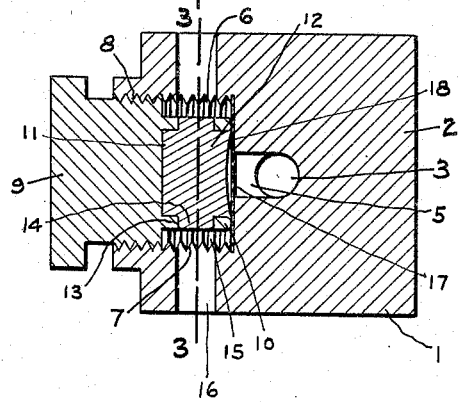
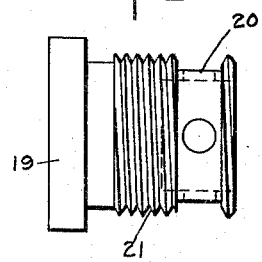
INVENTOR.
WILLIAM F. BREIDENBACH.
BY
Lockwood & Lockwood
ATTORNEY.

UNITED STATES PATENT OFFICE.

WILLIAM F. BREIDENBACH, OF INDIANAPOLIS, INDIANA.

SAFETY DEVICE FOR HIGH-PRESSURE GAS-TANKS.

1,303,248.  Specification of Letters Patent.  Patented May 13, 1919.

Application filed August 9, 1918. Serial No. 249,127.

*To all whom it may concern:*

Be it known that I, WILLIAM F. BREIDENBACH, a citizen of the United States, and a resident of Indianapolis, county of Marion, and State of Indiana, have invented a certain new and useful Safety Device for High-Pressure Gas-Tanks; and I do hereby declare that the following is a full, clear, and exact description thereof, reference being had to the accompanying drawings, in which like numerals refer to like parts.

This invention relates to safety devices for high pressure gas tanks, and the prime feature of the invention is the provision, in connection with the valve for the tank, of a laterally extending bore communicating at one end with the main bore of the valve, and at its opposite end with a recess in the body of the valve, and having a removable plug threaded into the recess in the valve.

A further feature of the invention is the provision of a cavity in the inner end of the plug in which is placed a fusible material for preventing the escape of the contents of the tank to which the valve is attached under ordinary conditions, the walls of the cavity having openings therethrough for the reception of parts of the fusible material, thus forming projections which serve to hold the fusible material in the cavity in the plug.

A further feature of the invention is to so construct the plug that a space will be left between parts of the plug and the wall of the recess so that, as the material in the cavity is fused, it will flow around the plug and descend into the lower portion of the recess and at a point below the transversely extending ports leading into the recess.

A further feature of the invention is the provision of a fragile disk or diaphragm which fits between the end of the plug and the inner closed end of the recess and directly over the laterally extending bore, whereby the pressure of the contents of the tank to which the valve structure is attached will be removed from direct contact with the fusible material, said disk also serving as a seal by receiving pressure from the end of the plug.

And a further feature of the invention is the provision of transversely extending ports which communicate at their inner ends with the recess in the valve structure, and at their opposite ends with the side walls of the valve structure.

Other objects and advantages will be hereinafter more fully set forth and pointed out in the accompanying specification.

In the accompanying drawings which are made a part of this application, Figure 1 is a side elevation, partly in sections, of a valve adapted to be used in connection with high pressure tanks. Fig. 2 is an enlarged sectional view thereof as seen on line 2—2, Fig. 1. Fig. 3 is a sectional view as seen on line 3—3, Fig. 2. Fig. 4 is a view similar to Fig. 2 showing a slightly modified form of plug, and Fig. 5 is an elevation of that form of plug shown in Fig. 4, removed from the valve.

Referring to the drawings in which similar reference numerals designate corresponding parts throughout the several views, 1 indicates a valve structure such as is commonly used in connection with high pressure or oxygen tanks. The body portion 2 thereof is provided with a vertical bore 3 through which the contents of the tank escape through the valve. Between the valve stem 4 and the lower end of the bore 3 is a laterally extending bore 5, one end thereof communicating with the bore 3, and the opposite end with the recess 6 formed in the wall of the rear face of the body 2. The interior of the recess 6 is provided with threads 7 with which engage threads 8 of a plug 9, said plug closing communication through the outer end of the recess.

The form of plug 9, shown in Figs. 1, 2 and 3, has an extension 10 at its inner end, said extension being hollowed out to form a cavity 11 which is filled with fusible material 12, and in order to securely hold the fusible material in the cavity and at the same time provide openings for the escape of the fusible material should the same become fused. The wall of the extension is provided with a plurality of openings 13, the fusible material also entering said openings, and when hardened forms studs 14 which prevent the escape of the fusible material, when in hardened condition, from the cavity.

The extension 10 is of less diameter than the diameter of the recess, so as to leave a space 15 between the extension 10 and the wall of the recess 6 so that when the fusible material begins to fuse and leaves the cavity through the openings 13, it will descend through the space 15 and be out of the path of the escaping gases.

In order to provide proper escape openings for the gas, should the fusible material be fused, the body 2 of the valve structure is provided with transversely extending ports 16 which are so located as to intersect the recess 6 substantially at its axial center, and by properly positioning the plug 9, said ports will be directly opposite two of the openings 13 in the extension 10, thus permitting the gas to pass directly from said openings into the port from whence it will escape to the exterior of the valve.

The full pressure of the gases against the fusible material is prevented by introducing a disk or diaphragm 17, of comparatively fragile metal, between the end of the extension 10 and the end wall 18 of the cavity 6, so that the disk will be positioned directly over the outer end of the bore 5, and to more perfectly seal the bore 5, the free end of the extension 10 is preferably rounded so that when pressed against the disk, it will more securely impinge the same against the wall 18.

Instead of providing an extension at the inner end of the plug, which is reduced in diameter, that form of plug 19 shown in Figs. 4 and 5 may be used, and in this instance a peripheral channel 20 is provided by removing portions of the threads 21 of the plug so as to provide a space for the escape of the fusible material when fused. In this form of plug, the diameter is maintained the full length thereof so that the threads will coöperate with the threads within the recess 6, the full length of the recess, and when the plug is turned its full distance within the recess, the channel 20 will be in alinement with the ports 16 in the walls of the body.

The present invention is designed as a safety device to prevent an explosion of the contents of a tank, to which the valve is attached, should the tank be overheated, as the excess heat would fuse or melt the fusible material before the temperature within the tank would reach the exploding point, and as soon as the material is partially or entirely fused, the pressure of the contents of the tank would destroy the disk or diaphragm and permit the gas to escape through the ports in the walls of the valve, and should there be a flame around or adjacent the tank, the gases would ignite and be consumed.

This attachment can be very cheaply manufactured and readily attached to the valve structure, and as the parts carrying the fusible material are integral with and made of the same material as the body of the plug, it will be impossible to destroy or injure the same, and the cavity can be refilled with fusible material at any time.

The invention claimed is:

1. In a safety device for high pressure gas tanks, the combination with a valve having a recess in one face thereof and a bore communicating with said recess, of a plug adapted to thread into said recess and close communication through the outer end thereof, an extension at the inner end of said plug spaced from the wall of said recess, the free end of said extension having a cavity therein, the walls of said cavity having openings and fusible material adapted to fill said cavity and openings for closing communication through the bore connecting with the recess.

2. In a safety device for high pressure gas tanks, the combination with a valve having a recess extending inwardly from one face thereof, and a bore communicating with the inner end of said recess, of a plug adapted to close communication through the recess, a portion of the inner end of said plug being spaced from the wall of the recess to form a clearance space, the inner end of said plug having a cavity the walls of which are provided with openings, and fusible material in said cavity and openings.

3. In a safety device for high pressure gas tanks, the combination with a valve having a recess extending inwardly from one face thereof, and a bore communicating with the inner end of the recess, the side walls of the valve having laterally extending ports communicating with the recess, of a plug adapted to enter said recess, an extension at the inner end of the plug having a cavity the walls of which are provided with openings, and fusible material in said cavity and openings for closing communication through said bore, and which when fused will permit gases to pass through said cavity and openings and through the ports in the side walls of the valve.

4. In a safety device for high pressure gas tanks, the combination with a valve structure having a recess and a bore communicating therewith, of a plug adapted to enter said recess, an extension at the inner end of said plug spaced from the wall of said recess, the inner end of said extension being adapted to impinge against the end wall of the recess, said inner end of the plug having a cavity, and the walls of the cavity having openings, and fusible material in said cavity and openings which will normally close communication through said bore and permit the escape of gas through the cavity and openings when the fusible material is fused.

5. A safety device for high pressure gas tanks comprising a plug, said plug having a cavity in its inner end, and openings through the wall of the cavity, and fusible material in said cavity and openings, parts of the diameter of said plug being reduced to form a space for the passage of the fusible material when fused.

6. In a safety device for high pressure gas tanks, the combination with a valve having a recess extending inwardly from one face and a bore communicating with the inner end of said recess, of a plug adapted to thread into said recess and press against the inner wall thereof, the inner end of said plug having a cavity and openings through the wall of the cavity, and fusible material in said cavity and openings, a portion of the periphery of said plug being reduced in diameter whereby a space will be formed between the reduced portion and the wall of the recess for the passage of the fusible material when fused.

7. In a safety device for high pressure gas tanks, the combination with a valve structure having a recess extending inwardly from one face thereof, said valve structure having ports extending inwardly through the side walls of the valve and communicating with said recess, and having a bore communicating with the inner end of the recess, of a plug adapted to enter said recess, an extension at the inner end of the plug of less diameter than the diameter of the plug, said extension having a cavity open at one end and openings transversely thereof and in line with said ports, and fusible material filling said cavity and openings adapted to close communication between said ports and bore and permit the passage of gas through said bore and ports when fused.

8. In a safety device for high pressure gas tanks, the combination with a valve structure having a recess and a bore communicating therewith, of a disk adapted to fit over said bore and rest against the inner end wall of the recess, a plug adapted to be threaded into said recess, a reduced extension at the inner end of said plug adapted to force said disk against said wall to prevent leakage therebetween, the end of the extension engaging the disk being rounded, said extension having a cavity in its inner end and fusible material in said cavity.

In witness whereof I have hereunto affixed my signature.

WILLIAM F. BREIDENBACH.

Copies of this patent may be obtained for five cents each, by addressing the "Commissioner of Patents, Washington, D. C."